United States Patent
Maeda et al.

(10) Patent No.: US 11,112,391 B2
(45) Date of Patent: Sep. 7, 2021

(54) MASS SPECTROMETRIC DATA PROCESSING DEVICE FOR QUALITATIVE ANALYSIS

(71) Applicant: SHIMADZU CORPORATION, Kyoto (JP)

(72) Inventors: Kengo Maeda, Kyoto (JP); Tomohiro Kawase, Kyoto (JP); Yutaro Yamamura, Kyoto (JP); Tomoomi Hoshi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 736 days.

(21) Appl. No.: 15/762,818

(22) PCT Filed: Sep. 25, 2015

(86) PCT No.: PCT/JP2015/077047
§ 371 (c)(1),
(2) Date: Sep. 19, 2018

(87) PCT Pub. No.: WO2017/051468
PCT Pub. Date: Mar. 30, 2017

(65) Prior Publication Data
US 2019/0011410 A1  Jan. 10, 2019

(51) Int. Cl.
*G01N 30/86* (2006.01)
*G01N 27/62* (2021.01)
(Continued)

(52) U.S. Cl.
CPC ....... *G01N 30/8679* (2013.01); *G01N 27/626* (2013.01); *G01N 27/70* (2013.01);
(Continued)

(58) Field of Classification Search
CPC .. G01N 30/8679; G01N 27/626; G01N 27/70; G01N 30/86; G01N 30/72; G06K 9/0053; H01J 49/0036
See application file for complete search history.

(56) References Cited

U.S. PATENT DOCUMENTS 5,742,525 A * 4/1998 Ye .................... G01N 21/274
250/252.1
2013/0330755 A1* 12/2013 Joshi ............. C12Y 302/01096
435/18

(Continued)

FOREIGN PATENT DOCUMENTS

EP          2 765 414 A1     8/2014
JP        2011-033346 A      2/2011
(Continued)

OTHER PUBLICATIONS

Written Opinion of the International Searching Authority of PCT/JP2015/077047 dated Dec. 22, 2015.
(Continued)

*Primary Examiner* — Alexander Satanovsky
(74) *Attorney, Agent, or Firm* — Sughrue Mion, PLLC (57) ABSTRACT

A degree of similarity in the peak pattern between a mass spectrum obtained for an unknown target substance in a sample and a mass spectrum of a known specific substance is calculated (S4). If the degree of similarity is within a range of 80-60% ("No" in S6), the ratio between the signal intensities at two mass-to-charge ratios characteristic of the specific substance is calculated and compared with a reference value (S7 and S8). If the intensity ratio exceeds the reference value, the target substance is likely to be the specific substance. Therefore, as in the case where the degree of similarity is equal to or higher than 80%, it is concluded that the specific substance is contained in the sample (S10). In advance of such a judgment, whether or not
(Continued)

the sample has been certainly subjected to the mass spectrometric analysis is determined from a graph of the total ion current signal created from data collected by performing a measurement from a point in time before the sample is placed at a measurement position (S2 and S3). If no significant peak is present in the graph, it is concluded that a sample introduction error has occurred (S11). By such a method, a higher level of qualitative determination accuracy can be achieved than in a conventional qualitative analysis using only the degree of similarity.

6 Claims, 4 Drawing Sheets

(51) Int. Cl.
    *G01N 27/70*      (2006.01)
    *G06K 9/00*      (2006.01)
    *H01J 49/00*      (2006.01)
    *G01N 30/72*      (2006.01)
    *G01N 27/626*      (2021.01)

(52) U.S. Cl.
    CPC ........ *G06K 9/0053* (2013.01); *H01J 49/0036* (2013.01); *G01N 30/72* (2013.01); *G01N 30/86* (2013.01)

(56) References Cited

U.S. PATENT DOCUMENTS

| | | | |
|---|---|---|---|
| 2014/0132607 A1* | 5/2014 | Kawana | ................ G06T 11/206 345/440 |
| 2014/0183353 A1 | 7/2014 | Shimada et al. | |
| 2017/0067864 A1 | 3/2017 | Kudo et al. | |

FOREIGN PATENT DOCUMENTS

| | | | |
|---|---|---|---|
| JP | 2011-242255 A | | 12/2011 |
| JP | 2013-002967 A | | 1/2013 |
| JP | 2013-064730 A | | 4/2013 |
| JP | 2013-213764 A | | 10/2013 |
| WO | 2013/031881 A1 | | 3/2013 |
| WO | 2015/102053 A1 | | 7/2015 |
| WO | 2015/132901 A1 | | 9/2015 |

OTHER PUBLICATIONS

International Search Report of PCT/JP2015/077047 dated Dec. 22, 2015.

* cited by examiner

MASS SPECTROMETRIC DATA PROCESSING DEVICE FOR QUALITATIVE ANALYSIS

CROSS REFERENCE TO RELATED APPLICATIONS

This application is a National Stage of International Application No. PCT/JP2015/077047 filed Sep. 25, 2015.

TECHNICAL FIELD

The present invention relates to a mass spectrometric data processing device for identifying a substance (compound) in a sample by means of a mass spectrometer.

BACKGROUND ART

When it is necessary to identify an unknown substance in a sample or determine whether or not a known substance is contained in a sample, a qualitative analysis using a mass spectrometer is frequently used. In general, a qualitative analysis using a mass spectrometer includes a data-processing operation in which a peak pattern on a measured mass spectrum obtained by a mass spectrometric analysis is compared with the peak pattern of a known substance registered in a spectrum library (database), and the degree of similarity between the two patterns is evaluated (see Patent Literature 1 or other documents). Typically, in such a data-processing operation, when the degree of similarity in the peak pattern exceeds a predetermined threshold, it is concluded that the unknown substance in the sample is likely to be the known substance in the spectrum library, or the known substance is likely to be present in the sample.

Such a technique of the qualitative analysis relies on the degree of similarity in the peak pattern of the mass spectrum. However, even when the substance to be qualitatively determined is registered in the spectrum library, the degree of similarity may lack reliability due to the following various factors:

(1) If the concentration of the target substance in the sample is extremely low, various kinds of noise will be comparatively higher and make the signal originating from the target substance less noticeable on the mass spectrum, causing the degree of similarity to be underestimated as compared to its actual value.

(2) If the concentration of the target substance in the sample is extremely low, various kinds of noise will be comparatively higher and be incorrectly detected as a signal originating from the target substance on the mass spectrum, causing the degree of similarity to be overestimated as compared to its actual value.

(3) If a substance whose chemical structure is similar to that of the target substance is mixed in the sample, a signal originating from that similar substance will be incorrectly detected as a signal originating from the target substance on the mass spectrum, causing the degree of similarity to be overestimated as compared to its actual value.

(4) If the sample is not properly introduced into the mass spectrometer, the signal intensity corresponding to the target substance which is present in the sample will become close to zero, causing the degree of similarity to be extremely low, so that the target substance will be incorrectly judged to be non-existent in the sample.

As just described, the degree of similarity in the peak pattern of the mass spectrum is not always sufficiently reliable since it depends on the condition of the sample, state of the noise and other factors. This has conventionally been a factor of the deterioration of the qualitative accuracy.

The previously described determination on the presence or absence of a substance based on the degree of similarity in the peak pattern of the mass spectrum is made on the premise that the intended task is to simply discriminate between the state in which the substances not present in the sample and the state in which the substance is present in the sample. Therefore, it is difficult to discriminate between a normal state in which a certain kind of substance is present in the sample and a state in which the same substance is present in a greater quantity (excessively) than in the normal state. Furthermore, such a discrimination will be low in accuracy.

CITATION LIST

Patent Literature

Patent Literature 1: JP 2013-2967 A

SUMMARY OF INVENTION

Technical Problem

The present invention has been developed to solve the previously described problem. Its objective is to provide a mass spectrometric data processing device for qualitative analysis capable of a qualitative determination of the presence or absence of a specific substance in a sample and/or qualitative determination of an unknown sample in a sample with a higher level of accuracy even when an accurate qualitative determination is difficult to achieve based on only the degree of similarity in the peak pattern of the mass spectrum, or based on the degree of similarity in the first place.

Solution to Problem

The present invention developed for solving the previously described problem is a mass spectrometric data processing device for qualitative analysis for qualitatively determining a substance contained in a sample, using data obtained by performing a mass spectrometric analysis on the sample, the device including:

a) a spectrum creator for creating a mass spectrum corresponding to a target substance in a sample based on data obtained from the sample;

b) an index value calculator for determining a signal intensity value at each of two mass-to-charge ratios previously determined for a specific substance in the mass spectrum corresponding to the target substance created by the spectrum creator, and for calculating a ratio or difference between the two signal intensity values as an index value; and c) a similarity index calculator for calculating, as a second index value, a degree of similarity in a peak pattern between a mass spectrum corresponding to the target substance and a mass spectrum corresponding to the specific substance; and d) an index value evaluator for evaluating the possibility that the target substance is the specific substance, by comparing the index value calculated by the index value calculator with a predetermined reference value or reference-value range, when the second index value calculated by the similarity index calculator is within a predetermined range.

The mass spectrometer for performing a mass spectrometric analysis used in the present invention is not limited to any specific form. The mass spectrometer may be a mass spectrometer capable of an MS/MS analysis or MS$^n$ analysis (where n is an integer equal to or greater than two), such as a tandem quadrupole mass spectrometer. In that case, the "mass spectrum" mentioned earlier is an MS/MS or MS$^n$ spectrum.

The signal intensity value determined from a mass spectrum in the index value calculator may be either the intensity value of a peak (normally, a needle-like peak after the centroid processing) at a specific mass-to-charge-ratio value, or the area value of a bell-shaped peak located around that specific mass-to-charge ratio before the centroid processing.

In the mass spectrometric data processing device according to the present invention, two mass-to-charge ratios at which the signal intensity value should be determined are previously specified according to the kind of substance whose presence or absence in a sample needs to be confirmed ("specific substance"), taking into account the features of the peaks appearing on the mass spectrum of that substance. As will be described later, if the specific substance is DecaBDE (decabromodiphenyl ether) which is a kind of brominated flame retardant, m/z=898.4 and m/z=897.4 can be chosen as the two mass-to-charge ratios, based on the features of the peaks appearing on the mass spectrum of the substance. If the target substance in the sample is DecaBDE, a high peak appears at m/z=898.4 on its mass spectrum, while a trough with a low signal intensity is formed at m/z=897.4. Accordingly, the index value calculated by the index value calculator will be a certain large value.

A determination method which relies on the aforementioned index value cannot yield a correct result if the sample additionally contains a substance that is different from the specific substance yet has a peak at one of the two mass-to-charge ratios (in the example of DecaBDE, at m/z=898.4).

Accordingly, in the present invention, the similarity index calculator calculates, as a second index value, a degree of similarity in a peak pattern between a mass spectrum corresponding to the target substance and a mass spectrum corresponding to the specific substance. The index value evaluator evaluates the possibility that the target substance is the specific substance, by comparing the index value calculated by the index value calculator with a predetermined reference value or reference-value range, when the second index value calculated by the similarity index calculator is within a predetermined range.

Specifically, for example, if the second index value is extremely high or extremely low, whether or not the target substance is the specific substance is determined based on the second index value. If the second index value is at an intermediate level between the two extremities and it is difficult to make the determination based on only that value, the first index value can be used to determine whether or not the target substance is the specific substance. In general, when the target substance is a substance that is different from the specific substance yet similar in chemical structure, the degree of similarity in the peak pattern of the mass spectrum typically has a value that is neither extremely high nor extremely low. In such a case, the device according to the present invention can introduce the new index value, i.e. the ratio between the signal intensities at two mass-to-charge ratios, to improve the accuracy of the qualitative determination. Furthermore, in a preferable mode of the present invention, the index value evaluator evaluates the possibility that the target substance is the specific substance, using the second index value calculated by the similarity index calculator, when the second index value is greater than the predetermined range.

Depending on the kind of specific substance whose presence or absence in the sample needs to be confirmed, on the kind of substance mixed in the sample, or on other factors, it may be impossible to achieve a proper qualitative determination based on the ratio between the signal intensities at the two mass-to-charge ratios. For example, such a situation occurs if it is previously known that the sample contains a different kind of substance which has a similarly characteristic signal intensity ratio at the two mass-to-charge ratios at which the characteristic signal intensities for the specific substance will be obtained.

Accordingly, as a preferable configuration of the present invention, the mass spectrometric data processing device may further include a condition specifier for allowing an analysis operator to select the index value to be used as a condition under which the index value evaluator evaluates the possibility that the target substance is the specific substance.

This configuration allows an analysis operator to make the index value evaluator switch to a processing mode in which the possibility that the target substance is the specific substance is evaluated by using only the second index value, i.e. in a similar manner to the conventional method, when the evaluation using the intensity ratio as the index value in the previously described manner is not useful. This helps to ensure the reliability of the qualitative determination.

The previously described determination on whether or not the target substance in the sample is the specific substance is premised on that the mass spectrometric analysis for the sample has been certainly performed, i.e. that the sample has been properly introduced into the mass spectrometer. However, in the case of a device in which the mass spectrometric analysis is performed on a sample placed at a designated measurement position, the measurement may possibly be performed with the sample placed at an incorrect position different from the measurement position due to a certain cause, regardless of whether the sample is automatically transferred to the measurement position by a sample transfer system or manually set at the measurement position by an operator. In such a case, it is naturally impossible to detect the specific substance even when the substance is contained in the sample.

Accordingly, as a more preferable configuration of the present invention, the mass spectrometric data processing device may further include:

a graph creator for creating a graph showing a temporal change in a signal intensity over the entire mass-to-charge-ratio range or a predetermined mass-to-charge-ratio range, based on data obtained by repetitively performing a mass spectrometric analysis; and a sample introduction determiner for determining that the sample is certainly subjected to the mass spectrometric analysis, based on the graph, and when it is determined by the sample introduction determiner that the sample is not subjected to the mass spectrometric analysis, the index value evaluator adopts this determination result as the evaluation result, regardless of the index value alone or the index value and the second index value.

If the sample is correctly set at the measurement position and the sample is subjected to a mass spectrometric analysis, a detection signal originating from some substance should appear in the analysis, regardless of whether or not the specific substance is contained in the sample. Accordingly, for example, based on a mass spectrometric analysis repeatedly performed for a predetermined temporal range including certain periods of time before and after the setting of the sample at the measurement position, the graph creator creates a graph showing a temporal change in the signal intensity over the entire mass-to-charge-ratio range or predetermined mass-to-charge-ratio range. This graph corresponds to the total ion chromatogram in a liquid chromatograph mass spectrometer (LC-MS) or similar device. If the sample is correctly set at the measurement position, a peak waveform should be observed within that period.

For example, if a peak of a certain size has been detected on the graph, the sample introduction determiner concludes that the sample has been certainly subjected to the mass spectrometric analysis. Conversely, if it is possible to conclude that the sample has not been subjected to the mass spectrometric analysis, it is useless to perform the qualitative processing for the target substance in the sample. In this case, the index value evaluator can output, for example, a result which shows that the sample has not been correctly introduced, in place of the result of the evaluation on the possibility that the target substance is the specific substance.

A mass spectrometric data processing device according to one mode developed for solving the previously described problem apart from the present invention is a mass spectrometric data processing device for qualitative analysis for qualitatively determining a substance contained in a sample, using data obtained by performing a mass spectrometric analysis on the sample set at a predetermined position or introduced at a predetermined timing, the device including:

a) a first graph creator for creating a first graph showing a temporal change in a signal intensity over the entire mass-to-charge-ratio range or a predetermined mass-to-charge-ratio range, based on data obtained by repetitively performing a mass spectrometric analysis from a predetermined point in time before the sample is set at the predetermined position or before the sample is introduced;

b) a second graph creator for creating, based on the data, a second graph showing a temporal change in a signal intensity at a mass-to-charge ratio characteristic of a specific substance; and c) a specific substance presence determiner for determining that the sample is certainly subjected to the mass spectrometric analysis, based on the first graph, and for determining whether or not the specific substance is contained in the sample, based on the second graph.

As noted earlier, if the sample is correctly set at the measurement position and the sample is subjected to a mass spectrometric analysis, or if the sample is introduced into the mass spectrometer at a predetermined timing and the mass spectrometric analysis is performed, a detection signal originating from some substance should appear in the analysis, regardless of whether or not the specific substance is contained in the sample. Accordingly, in the mass spectrometric data processing device according to the present mode the first graph creator creates a first graph which shows a temporal change in a signal intensity over the entire mass-to-charge-ratio range or predetermined mass-to-charge-ratio range, based on data obtained by repetitively performing a mass spectrometric analysis from a point in time before the sample is set at the predetermined position or before the sample is introduced. Meanwhile, based on the same set of data, the second graph creator creates a second graph which shows a temporal change in a signal intensity at a mass-to-charge ratio characteristic of the specific substance. The first graph corresponds to the total ion chromatogram in a liquid chromatograph mass spectrometer (LC-MS) or similar device, while the second graph corresponds to a mass chromatogram.

The specific substance presence determiner determines whether or not the sample has been certainly subjected to the mass spectrometric analysis, for example, based on whether or not a peak of a certain size is detected on the first graph. Provided that it has been determined that the sample is certainly supplied, the specific substance presence determiner determines whether or not the specific substance is contained in the sample, for example, based on whether or not a peak of a certain size is detected on the second graph. Whether or not a peak of a certain size is detected can be determined based on an appropriate index value, such as the ratio between an accumulated value of the signal intensity over a predetermined time range within a "no-sample period" in which no sample is introduced and an accumulated value of the signal intensity over a predetermined time range within a "with-sample period" in which the sample is introduced.

Advantageous Effects of the Invention

In the mass spectrometric data processing device for qualitative analysis according to the present invention, when it is difficult to perform an accurate qualitative determination based on only the degree of similarity in the peak pattern of the mass spectrum, a different index value can be alternatively or additionally used to determine whether or not a specific substance is contained in a sample, whether or not an unknown substance in a sample is a specific substance, whether or not an unknown substance in a sample is one of a plurality of specific substances, etc., with a higher level of accuracy, and the result can be presented to an analysis operator.

DESCRIPTION OF EMBODIMENTS

First Embodiment

The first embodiment of a qualitative analyzer system employing a mass spectrometric data processing device according to the present invention is hereinafter described with reference to the attached drawing.

Figure 1:
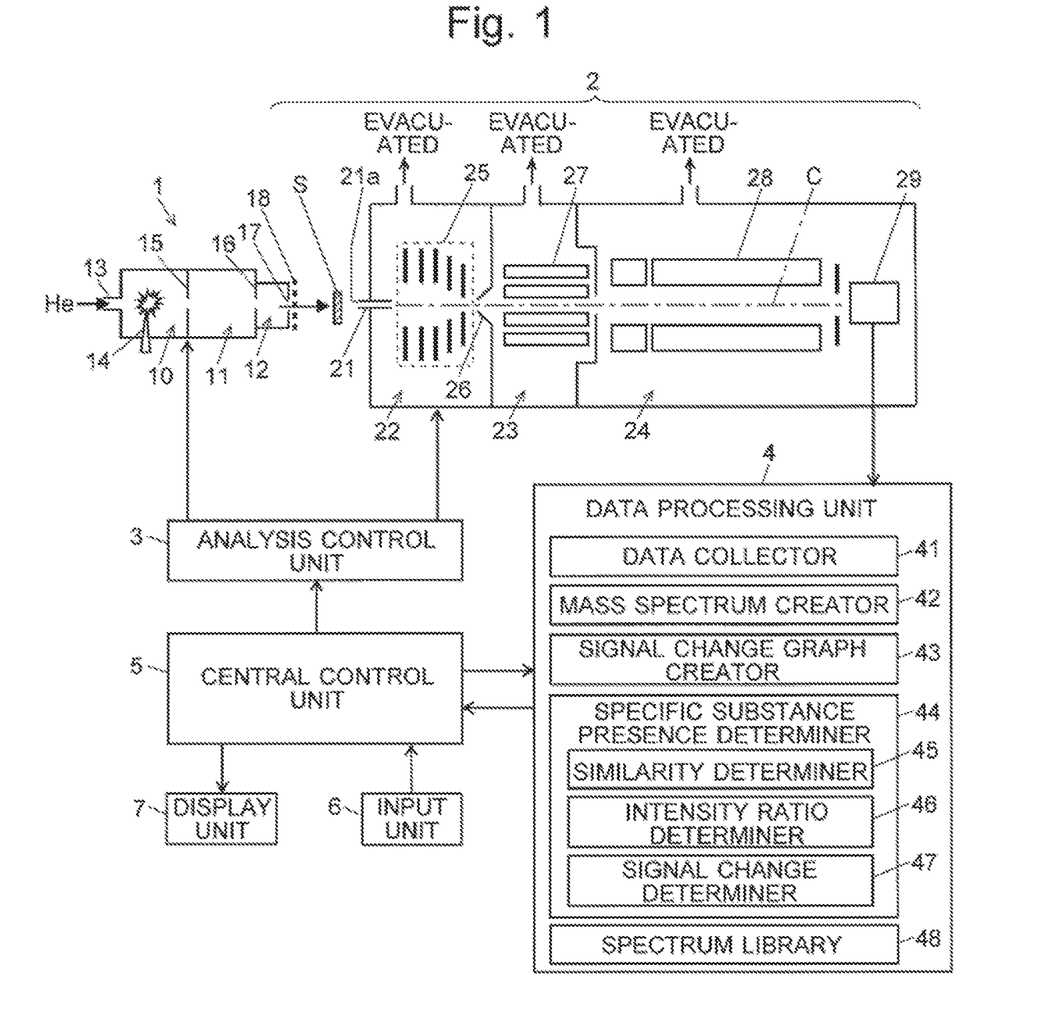
FIG. 1 is a configuration diagram of the main components of a qualitative analyzer system as the first embodiment of the present invention.

FIG. 1 is a configuration diagram of the main components of the qualitative analyzer system in the first embodiment. This system includes a DART mass spectrometer as the mass spectrometer.

In the qualitative analyzer system according to the present embodiment, the DART mass spectrometer includes a DART ionization unit 1 and a mass spectrometry unit 2. The mass spectrometry unit 2 has the configuration of a multi-stage differential pumping system including an atmospheric pressure area in which the ionization is performed and an analysis chamber 24 maintained at a high degree of vacuum, between which first and second intermediate vacuum chambers 22 and 23 with the degrees of vacuum increased in a stepwise manner are provided. The atmospheric pressure area communicates with the first intermediate vacuum chamber 22 through a thin ion introduction tube 21. The DART ionization unit 1 is arranged so as to face the inlet opening 21a of the ion introduction tube 21. As shown in FIG. 1, sample S to be analyzed is inserted at a measurement position between the inlet opening 21a and the DART ionization unit 1. Though not shown in FIG. 1, sample S may be automatically transferred to the measurement position by means of an automatic sample transfer device.

The DART ionization unit 1 has three chambers: a discharging chamber 10, reaction chamber 11 and heating chamber 12. A gas introduction tube 13 for introducing inert gas (e.g. helium) is connected to the discharging chamber 10 in the first stage. A needle electrode 14 is provided inside the discharging chamber 10. A heater (not shown) is attached to the heating chamber 12 in the last stage. A grid electrode 18 is provided on the outside of a nozzle 17 which functions as the outlet of the heating chamber 12.

The first and second intermediate vacuum chambers 22 and 23 are separated from each other by a skimmer 26 which has a small hole at its apex. Ion guides 25 and 27 for transporting ions into subsequent stages while converging them are respectively placed inside the first and second intermediate vacuum chambers 22 and 23. In the present embodiment, the ion guide 25 includes a plurality of (e.g. four) virtual rod electrodes arranged around an ion optical axis C, with each virtual rod electrode consisting of a plurality of plate electrodes arranged along the ion optical axis C. The other ion guide 27 includes a plurality of (e.g. eight) rod electrodes arranged around the ion optical axis C, with each rod electrode extending in the direction of the ion optical axis C. The analysis chamber 24 contains a quadrupole mass filter 28 for separating ions according to their mass-to-charge ratios m/z as well as a detector 29 for detecting ions which have passed through the quadrupole mass filter 28. Detection signals produced by this detector 29 are sent to a data processing unit 4.

An analysis control unit 3 receives instructions from a central control unit 5 and performs a measurement by controlling the relevant sections of the DART ionization unit 1 and the mass spectrometry unit 2. The data processing unit 4 processes data produced by digitizing the detection signals obtained with the detector 29. This unit includes a data collector 41, mass spectrum creator 42, signal change graph creator 43, specific substance presence determiner 44, spectrum library 48 and other components as its characteristic functional blocks. The specific substance presence determiner 44 includes a similarity determiner 45, intensity ratio determiner 46 and signal change determiner 47. The central control unit 5 is responsible for the general control of the user interface and the entire system. An input unit 6 to be operated by an analysis operator and a display unit 7 are connected to the central control unit 5.

The data processing unit 4 and central control unit 5 can be typically configured using a personal computer or more sophisticated workstation as a hardware resource, with their respective functions realized by executing a dedicated controlling and processing software program previously installed on the computer.

A measurement operation for sample S in the DART mass spectrometer is hereinafter schematically described.

In the DART ionization unit 1, the discharging chamber 10 is supplied with helium gas through the gas introduction tube 13. With the discharging chamber 10 filled with the helium gas, a high voltage is applied to the needle electrode 14, whereupon an electric discharge occurs between the needle electrode 14 and the partition wall 15 which is maintained at ground potential. Due to this electric discharge, the base singlet molecular helium gas ($1^1S$) changes into a mixture of helium ions, electrons and excited triplet molecular helium ($2^3S$). This mixture enters the reaction chamber 11 in the next stage. In this chamber 11, the helium ions and electrons, which are both electrically charged particles, are blocked due to the effect of the electric field created by the voltages respectively applied to the partition walls 15 and 16 of the reaction chamber 11. Only the excited triplet molecular helium, which is electrically neutral, is sent into the heating chamber 12.

After being heated to high temperatures in the heating chamber 12, the excited triplet molecular helium is ejected from the nozzle 17 through the grid electrode 18. The excited triplet molecular helium in the heated state induces a Penning ionization of the water molecules in the atmosphere inside the chamber. The resulting water-molecule ions are in the excited state. The ejected gas is sprayed onto sample S placed in front of the nozzle 17, whereupon the component molecules in sample S turn into vapor due to the high temperature of the gas containing the excited triplet molecular helium. When the component molecules resulting from the vaporization come in contact with the water-molecule ions in the excited state, reactions between the molecules and ions occur and the component molecules turn into ions. Thus, the DART ionization unit 1 can ionize a solid or liquid sample S in a direct manner, i.e. in a statically placed state.

The generated ions are drawn through the ion introduction tube 21 into the intermediate vacuum chamber 22 due to the pressure difference between the atmospheric pressure and the gas pressure inside the first intermediate vacuum chamber 22. Those ions are converged by the ion guide 25 and sent through the small hole at the apex of the skimmer 26 into the second intermediate vacuum chamber 23, where the ions are converged by the ion guide 27 and sent into the analysis chamber 24. Among those ions, only ions having a mass-to-charge ratio corresponding to a predetermined voltage applied to the four rod electrodes constituting the quadrupole mass filter 28 are allowed to pass through the quadrupole mass filter 28 and enter the detector 29. The detector 29 produces detection signals corresponding to the amount of incident ions. Accordingly, for example, when the voltage applied to the four rod electrodes constituting the quadrupole mass filter 28 is continuously changed over a predetermined range, the mass-to-charge ratio of the ion being allowed to pass through the quadrupole mass filter 28 also continuously changes over a predetermined range of mass-to-charge ratios. Based on the detection signals sequentially obtained during this operation, the data processing unit 4 can create a mass spectrum showing the signal intensity of the ions over a predetermined range of mass-to-charge ratios.

Figure 2:
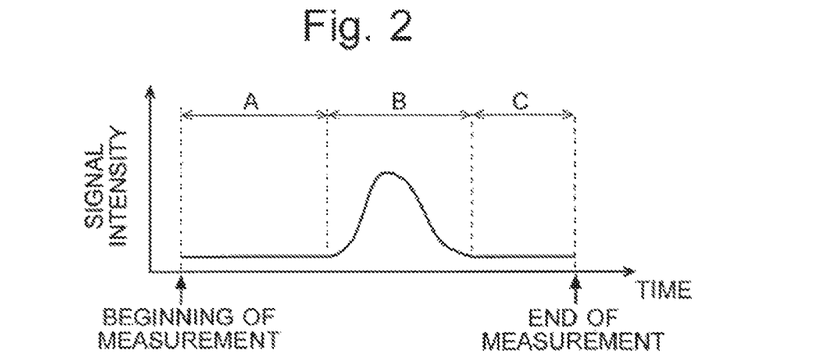
FIG. 2 is a conceptual diagram of a temporal change in the total ion current signal obtained by a measurement for a sample in the qualitative analyzer system in the first embodiment.

The data collector 41 in the data processing unit 4 begins to collect data from the point in time where the command to initiate the measurement is issued. Subsequently, sample S is inserted into the predetermined measurement position for a predetermined period of time, as shown in FIG. 1. The data-collecting operation is continued until a command to discontinue the measurement is issued after the sample has been removed. Therefore, the total ion current (TIC) signal obtained with the detector 29 regardless of the mass-to-charge ratios temporally changes with time, as shown in FIG. 2. In FIG. 2, "A" is the period of time where sample S is not yet inserted into the measurement position, "B" is the period of time where sample S is at least partially inserted at the measurement position, and "C" is the period of time after the removal of sample S from the measurement position.

Figure 3:
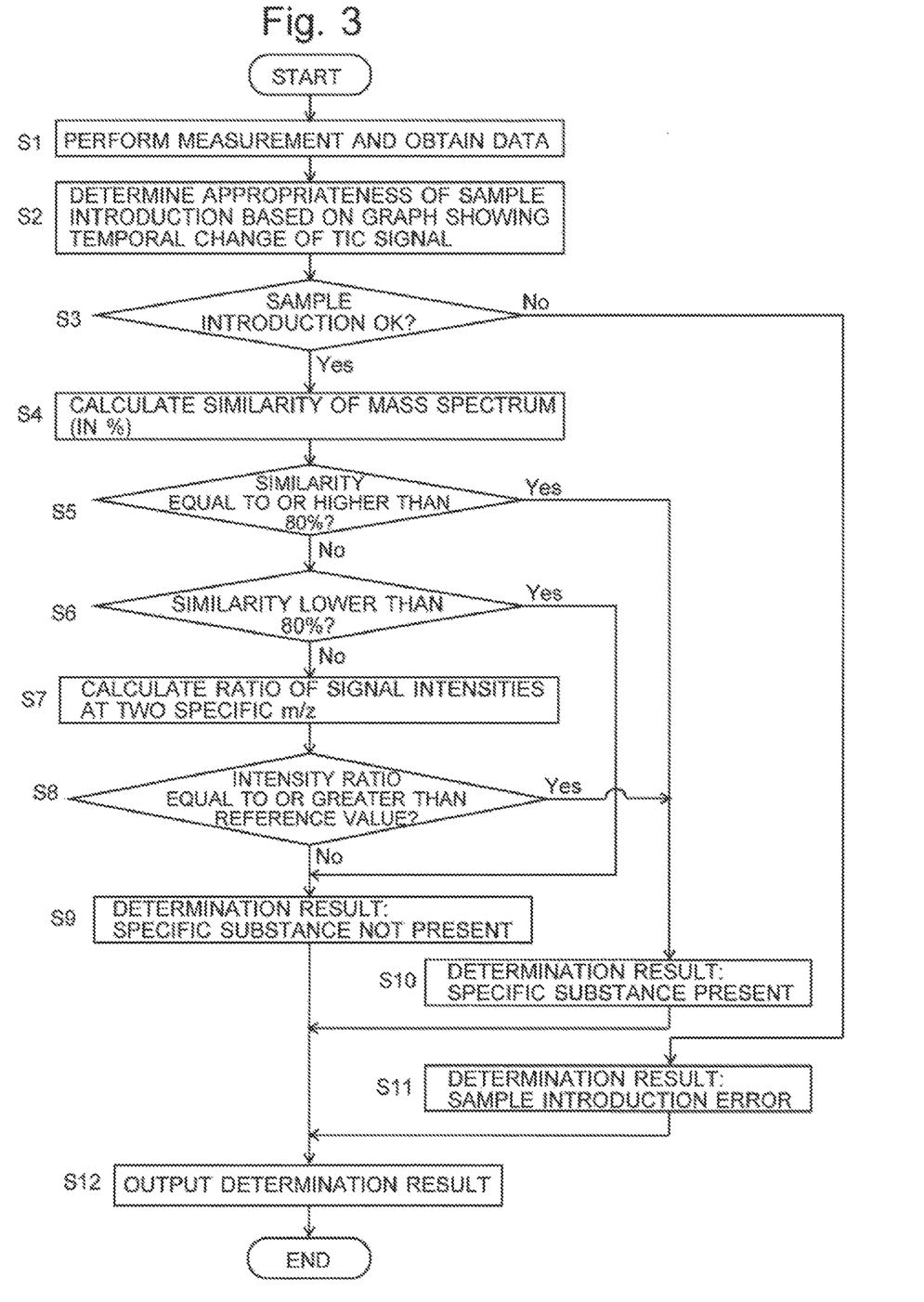
FIG. 3 is a flowchart of the data processing for a qualitative determination in the qualitative analyzer system in the first embodiment.

Next, a data-processing operation for a qualitative determination on the presence or absence of a specific substance in a sample in the qualitative analyzer system of the present embodiment is described according to the flowchart shown in FIG. 3. It is hereinafter assumed that the specific substances DecaBDE (decabromodiphenyl ether), which is a kind of brominated flame retardant. DecaBDE is a substance regulated under the RoHS (Restriction of Hazardous Substances) Directive as a PBDE preparation. It is important to correctly discriminate this substance from other brominated flame retardants having similar structures and determine its presence. The name of this specific substance (or identifier or similar information for identifying the substance) is previously specified by an analysis operator using the input unit 6.

As described earlier, a measurement on sample S is performed by the DART mass spectrometer under the control of the analysis controller 3. The data collector 41 collects the measurement data (mass spectrum data obtained at each measurement time point) and stores them (Step S1). Based on the collected data, the signal change graph creator 43 creates a graph showing a temporal change of the TIC signal (this graph is hereinafter called the "TIC graph"), as shown in FIG. 2. The signal change determiner 47 in the specific substance presence determiner 44 detects a peak on the TIC graph and determines whether or not the sample has been properly introduced, based on the peak width and/or peak intensity value (Step S2). If sample S has not been set at the measurement position within the period of time from the beginning to the end of the measurement due to a problem with the device, incorrect manual operation or some other reasons, no peak will appear on the TIC graph. Accordingly, the appropriateness of the sample introduction can be determined by using the TIC graph. If it has been determined that the sample has not been properly introduced, the operation proceeds from Step S3 to Step S11, to conclude that a sample introduction error has occurred.

If it has been determined that the sample has been properly introduced, the operation proceeds from Step S3 to Step S4, where the mass spectrum creator 42 creates a mass spectrum corresponding to the unknown target substance in the sample, based on the measurement data. For example, the mass spectrum can be created at the point in time where the peak top appears in the graph showing the temporal change of the ion current signal (detection signal) at a mass-to-charge ratio which has been previously designated for the TIC graph mentioned earlier or for the specific substance (the graph is hereinafter called the "specific m/z graph"). According to a predetermined algorithm, the similarity determiner 45 calculates the degree of similarity (in percentages) between the peak pattern (the mass-to-charge-ratio values and signal intensities of a plurality of peaks) on the measured mass spectrum for the target substance and that of the mass spectrum corresponding to the specific substance read from the spectrum library 48 (Step S4).

Furthermore, the similarity determiner 45 determines whether or not the calculated degree of similarity is equal to or higher than 80% (Step S5). If the degree of similarity is equal to or higher than 80%, the operation proceeds to Step S10 to conclude that the target substance is likely to be the specific substance; i.e. the specific substance is contained in the sample. If it has been determined in Step S5 that the degree of similarity is not equal to or higher than 80% the similarity determiner 45 subsequently determines whether or not the calculated degree of similarity is lower than 60% (Step S6). If it has been determined that the degree of similarity is lower than 60% the operation proceeds to Step S9 to conclude that the target substance is unlikely to be the specific substance; i.e. the specific substance is not contained in the sample.

If the determination result in Step S6 is "No", i.e. when the degree of similarity is equal to or higher than 60% and lower than 80%, it is difficult to make an appropriate qualitative determination based on only the degree of similarity; an incorrect determination is likely to occur. Accordingly, the intensity ratio determiner 46 extracts two signal intensity values at two specific mass-to-charge ratios in the measured mass spectrum for the target substance and calculates the ratio between those intensity values as an additional index value different from the degree of similarity (Step S7). Then, the intensity ratio determiner 46 determines whether or not the intensity ratio exceeds a reference value previously determined for the specific substance, or whether or not the ratio is within a predetermined range equal to higher than the reference value (Step S8).

Figure 4:
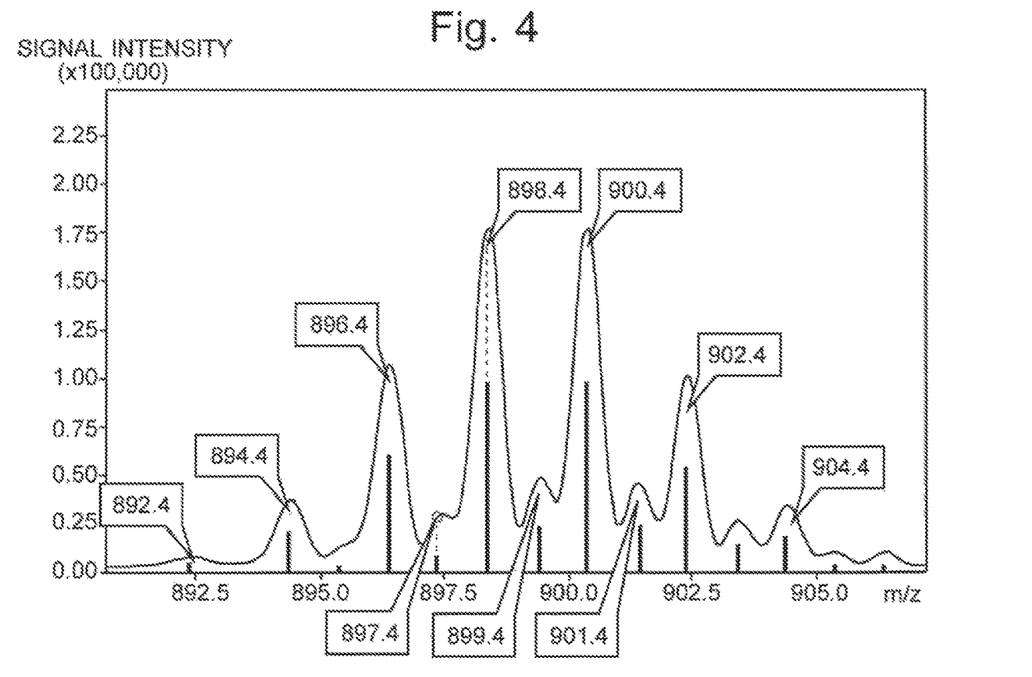
FIG. 4 is one example of the mass spectrum for a brominated flame retardant DecaBDE as one substance whose presence needs to be confirmed.

An evaluation using such an index is reasonable, as will be hereinafter described. FIG. 4 is a typical mass spectrum of DecaBDE. As can be seen in FIG. 4, a mass spectrum of DecaBDE has a series of characteristic peaks appearing at intervals of 2 Da, starting from m/z=892.4. By comparison, in the case of other brominated flame retardants (e.g. ethylenebis(tetrabromophthalimido)), although a similar series of characteristic peaks appear at intervals of 2 Da, the mass-to-charge ratio at which the series of peaks begins to appear does not coincide with any of the positions at which peaks appear in the case of DecaBDE. Therefore, if the signal intensity ratio is calculated between m/z=898.4 which corresponds to the peak top of a peak having a significant intensity and m/z=897.4 which is displaced from that point by 1 Da, the intensity ratio for DecaBDE will have a considerably large value, while the intensity ratio for other brominated flame retardants will have small values. Accordingly, based on whether or not that intensity ratio exceeds a reference value previously determined by an experiment, it is possible to determine whether the measured target substance is DecaBDE as the specific substance or other brominated flame retardants.

Therefore, in the present embodiment, the intensity ratio determiner 46 extracts the signal intensity values at m/z=898.4 and m/z=897.4 on the measured mass spectrum, calculates the intensity ratio between the two values, and determines whether or not the intensity ratio exceeds the predetermined reference value. If the intensity value exceeds the reference value, the target substance is likely to be the specific substance, so that the operation proceeds to Step S10 mentioned earlier. If the intensity value is lower than the reference value, the target substance is unlikely to be the specific substance, so that the operation proceeds to Step S9 mentioned earlier. After the determination result has been fixed in one of the Steps S9-S11, the determination result is presented on the screen of the display unit 7 via the central control unit 5 (Step S12).

Thus, as compared to a conventional system, the qualitative analyzer system according to the present embodiment can more accurately determine whether or not a target substance in a sample is a specific substance, by using two index values, i.e. the degree of similarity in the peak pattern of the mass spectrum and the ratio between the signal intensities at two mass-to-charge ratios on the mass spectrum. Needless to say, it is also possible to previously designate a plurality of specific substances as the candidates of the target substance and perform the previously described data-processing operation for the target substance for each of those specific substances, to determine which of the specific substances is the target substance, i.e. to identify the target substance.

In the previous embodiment, the two mass-to-charge ratios used for calculating the intensity ratio is determined by utilizing the fact that significant peaks appear at intervals of 2 Da on a mass spectrum of DecaBDE. It is evident that the two mass-to-charge ratios can be determined in accordance with the characteristics of the mass spectrum of the target substance and those of the mass spectra of other substances from which the target substance needs to be discriminated. Accordingly, it is evident that the mass-to-charge ratios, their difference and other values mentioned earlier are mere examples and should be changed depending on the kinds of substances.

In the previous embodiment, the intensity ratio as one index value is used when it is difficult to make a determination using the degree of similarity as another index value. However, depending on the kinds of substances, it may be preferable to make the determination using only the degree of similarity, or conversely, using only the intensity ratio. Accordingly, the device may be configured to allow an analysis operator using the input unit 6 to previously specify the index value to be used for the determination in the specific substance presence determiner 44.

Second Embodiment

Figure 6:
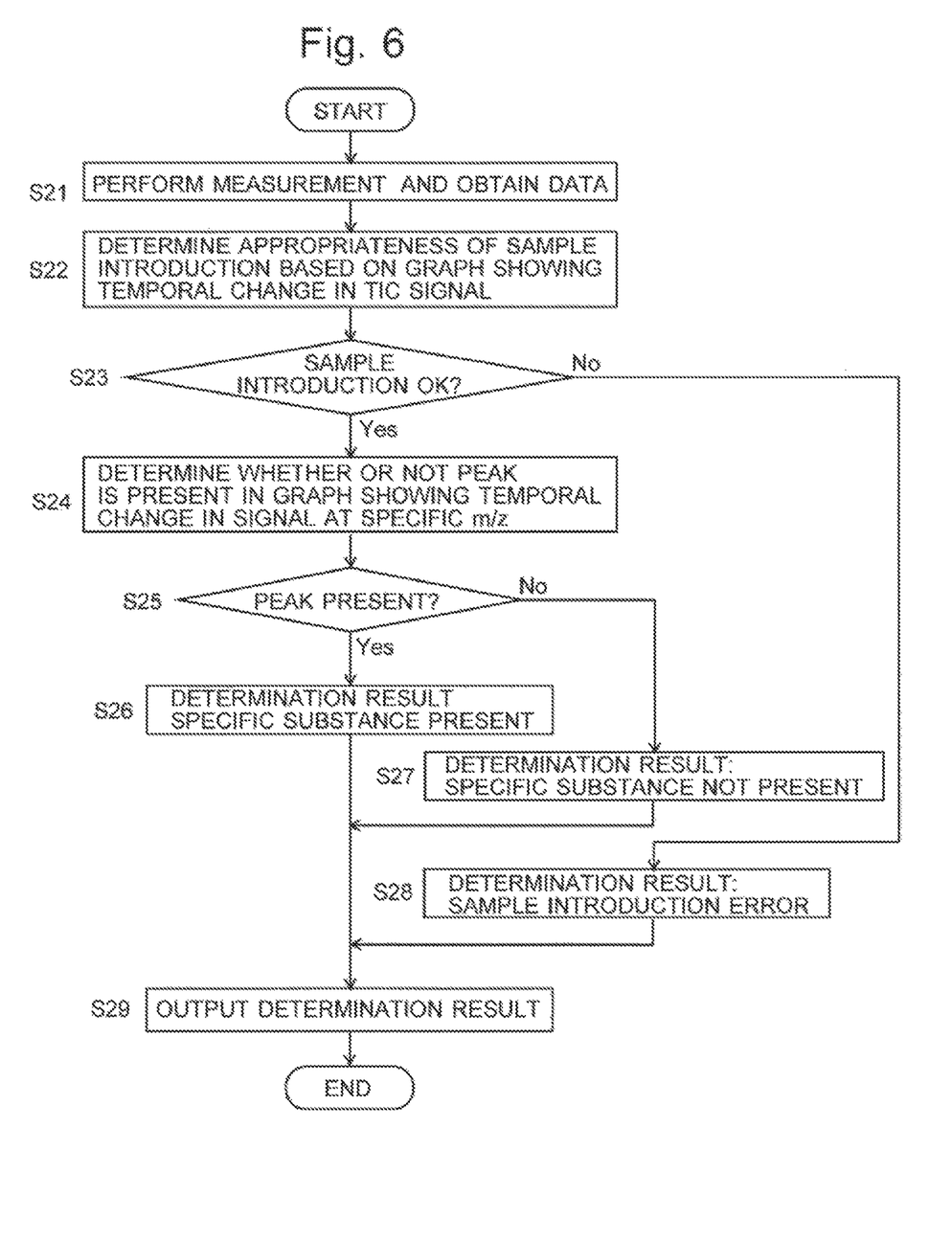
FIG. 6 is a flowchart of the data processing for a qualitative determination in the qualitative analyzer system in the second embodiment.

A qualitative analyzer system according to a second embodiment which is one embodiment of a related invention that is not included within the scope of the present invention is hereinafter described. The basic system configuration is the same as in the first embodiment. Therefore, the description of the configuration will be omitted, and FIG. 1 will be referred to as the configuration diagram in the following description. FIG. 6 is a flowchart of the data-processing operation for determining the presence or absence of a specific substance in a sample in the qualitative analyzer system according to the second embodiment. The specific substance in the present embodiment is phthalate ester. Although phthalate ester is commonly used as an industrial plasticizer, the substance has been regulated under the RoHS Directive from the viewpoint of safety. Accordingly, it is important to determine whether or not phthalate ester is contained in a given sample. However, since phthalate ester is widely present in the surrounding environment, it is difficult to correctly determine its presence based on only the degree of similarity in the peak pattern of the mass spectrum. The name of this specific substance or similar information is previously specified by an analysis operator using the input unit 6.

The processes in Steps S21-S23 are the same as the processes in Steps S1-S3 in the first embodiment: A measurement on sample S is performed with the DART mass spectrometer, and measurement data are stored in the data collector 41 (Step S21). The signal change graph creator 43 creates a TIC graph based on the collected data. Based on the result of the peak detection on the TIC graph, the signal change determiner 47 determines whether or not the sample has been properly introduced (Steps S22 and S23). If it has been determined that the sample has not been properly introduced, the operation proceeds from Step S23 to Step S28, to conclude that a sample introduction error has occurred.

Figure 5:
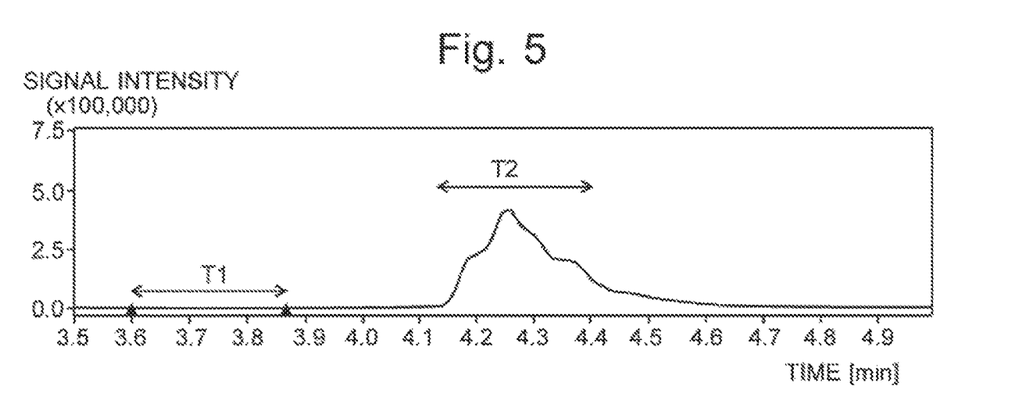
FIG. 5 is one example of a graph showing a temporal change in the ion current signal at a mass-to-charge ratio of an ion originating from phthalate ester DEHP as one substance whose presence needs to be confirmed.

On the other hand, if it has been determined that the sample has been properly introduced, the signal change graph creator 43 creates a specific m/z graph at a specific mass-to-charge ratio corresponding to the specific substance, based on the collected data. This graph corresponds to a mass chromatogram in an LC-MS or similar device. FIG. 5 is a measured specific m/z graph for an ion originating from phthalate ester DEHP. As shown, an unmistakable peak appears on the specific m/z graph if phthalate ester is contained. Accordingly, the device accumulates the signal intensity in the specific m/z graph over a certain period of time within the period of time before the introduction of the sample ($T_1$ in FIG. 5), as well as over a certain period of time within the period of time where the sample is being introduced ($T_2$ in FIG. 5), and calculates the ratio between the two accumulated values. Then, it compares this ratio of the accumulated values with a predetermined threshold, and determines that the peak is present if the ratio has exceeded the threshold (Steps S24 and S25).

If it has been determined that the peak is present, it is concluded that the specific substance is contained in the sample (Step S26). If it has been determined that no peak is present, it is concluded that the specific substance is not contained in the sample (Step S27). After the determination result has been fixed in one of the Steps S26-S28, the determination result is presented on the screen of the display unit 7 via the central control unit 5 (Step S29).

In this manner, the qualitative analyzer system according to the second embodiment can properly determine the presence or absence of a substance whose presence or absence cannot be determined based on the degree of similarity in the peak pattern of the mass spectrum.

The type of mass spectrometer that can be used in the present invention is not limited to a DART mass spectrometer as used in the first and second embodiments. The present invention is available not only in a qualitative analysis using a single-type mass spectrometer, but also in a qualitative analysis using a mass spectrometer capable of an MS/MS analysis, such as a tandem quadrupole mass spectrometer, Q-TOF mass spectrometer or TOF/TOF mass spectrometer, or a mass spectrometer capable of an MS$^n$ analysis, such as an ion trap mass spectrometer or ion trap TOF mass spectrometer.

It should also be noted that first embodiment is a mere example of the present invention, and any modification, change, addition or the like appropriately made within the spirit of the present invention will naturally fall within the scope of claims of the present application.

REFERENCE SIGNS LIST

1 . . . Dart Ionization Unit
10 . . . Discharging Chamber
11 . . . Reaction Chamber 12 . . . Heating Chamber
13 . . . Gas Introduction Tube
14 . . . Needle Electrode
15 . . . Partition Wall
17 . . . Nozzle
18 . . . Grid Electrode
2 . . . Mass Spectrometry Unit
21 . . . Ion Introduction Tube
21a . . . Inlet Opening
22 . . . First Intermediate Vacuum Chamber
23 . . . Second Intermediate Vacuum Chamber
24 . . . Analysis Chamber
25, 27 . . . Ion Guide
26 . . . Skimmer
28 . . . Quadrupole Mass Filter
29 . . . Detector
3 . . . Analysis Control Unit
4 . . . Data Processing Unit
41 . . . Data Collector
42 . . . Mass Spectrum Creator
43 . . . Signal Change Graph Creator
44 . . . Specific Substance Presence Determiner
45 . . . Similarity Determiner
46 . . . Intensity Ratio Determiner
47 . . . Signal Change Determiner
5 . . . Central Control Unit
6 . . . Input Unit
7 . . . Display Unit
C . . . Ion Optical Axis
S . . . Sample

The invention claimed is:

1. A mass spectrometric device for determining a substance contained in a sample, the mass spectrometric device comprising:
    a mass spectrometer configured to perform mass spectrometric analysis on the sample to obtain data of the sample;
    a mass spectrometer data processing device configured to perform qualitative analysis for qualitatively determining the substance contained in the sample based on the data, the mass spectrometer data processing device comprising:
    a) a spectrum creator for creating a mass spectrum corresponding to a target substance in the sample based on the data obtained by the mass spectrometer through the mass spectrometric analysis;
    b) an index value calculator for determining a signal intensity value at each of two mass-to-charge ratios previously determined for a specific substance in the mass spectrum corresponding to the target substance created by the spectrum creator, and for calculating a ratio or difference between the two signal intensity values as a first index value; and
    c) a similarity index calculator for calculating, as a second index value, a degree of similarity in a peak pattern between a mass spectrum corresponding to the target substance and a mass spectrum corresponding to the specific substance; and
    d) an index value evaluator for evaluating a possibility that the target substance is the specific substance, by comparing the first index value calculated by the index value calculator with a predetermined reference value or reference-value range, in response to the second index value calculated by the similarity index calculator being lower than a first threshold value and greater than a second threshold value.

2. The mass spectrometric device according to claim 1, wherein the mass spectrometric data processing device wherein the first index value evaluator evaluates the possibility that the target substance is the specific substance, using only the second index value calculated by the similarity index calculator, in response to the second index value being greater than the first threshold value.

3. The mass spectrometric data processing device according to claim 1, wherein the mass spectrometric data processing device further comprises:
    e) a condition specifier for allowing an analysis operator to select the first index value or the second index value to be used as a condition under which the index value evaluator evaluates the possibility that the target substance is the specific substance.

4. The mass spectrometric device according to claim 1, wherein the mass spectrometric data processing device further comprises:
    f) a graph creator for creating a graph showing a temporal change in a signal intensity over an entire mass-to-charge-ratio range or a predetermined mass-to-charge-ratio range, based on the data obtained by repetitively performing the mass spectrometric analysis; and
    g) a sample introduction determiner for determining whether the sample is subjected to the mass spectrometric analysis, based on the graph,
    wherein:
    when it is determined by the sample introduction determiner that the sample is not subjected to the mass spectrometric analysis, the index value evaluator adopts this determination result as an evaluation result, regardless of the first index value or the first index value and the second index value.

5. The mass spectrometric device according to claim 2, wherein the mass spectrometric data processing device further comprises:
    f) a graph creator for creating a graph showing a temporal change in a signal intensity over an entire mass-to-charge-ratio range or a predetermined mass-to-charge-ratio range, based on the data obtained by repetitively performing the mass spectrometric analysis; and
    g) a sample introduction determiner for determining whether the sample is subjected to the mass spectrometric analysis, based on the graph,
    wherein:
    when it is determined by the sample introduction determiner that the sample is not subjected to the mass spectrometric analysis, the index value evaluator adopts this determination result as an evaluation result, regardless of the first index value or the first index value and the second index value.

6. The mass spectrometric device according to claim 3, wherein the mass spectrometric data processing device further comprises:
    f) a graph creator for creating a graph showing a temporal change in a signal intensity over an entire mass-to-charge-ratio range or a predetermined mass-to-charge-ratio range, based on the data obtained by repetitively performing the mass spectrometric analysis; and
    g) a sample introduction determiner for determining whether the sample is subjected to the mass spectrometric analysis, based on the graph,
    wherein:
    when it is determined by the sample introduction determiner that the sample is not subjected to the mass spectrometric analysis, the index value evaluator adopts this determination result as an evaluation result, regardless of the first index value or the first index value and the second index value.

* * * * *